Sept. 26, 1950    J. A. NORDSTRÖM    2,523,876
ELECTRIC THAWER FOR PIPES
Filed Feb. 27, 1948
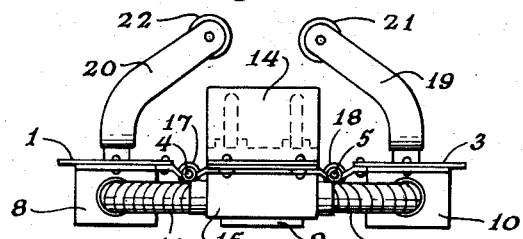
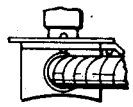
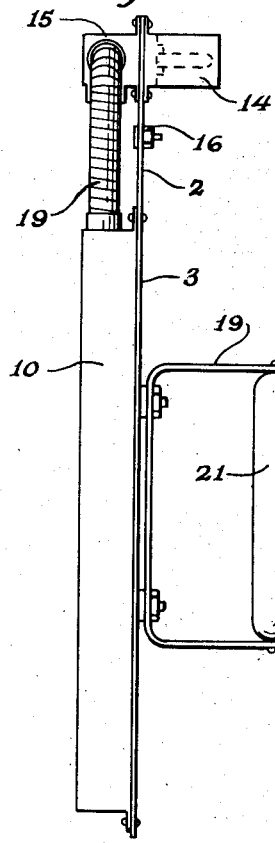
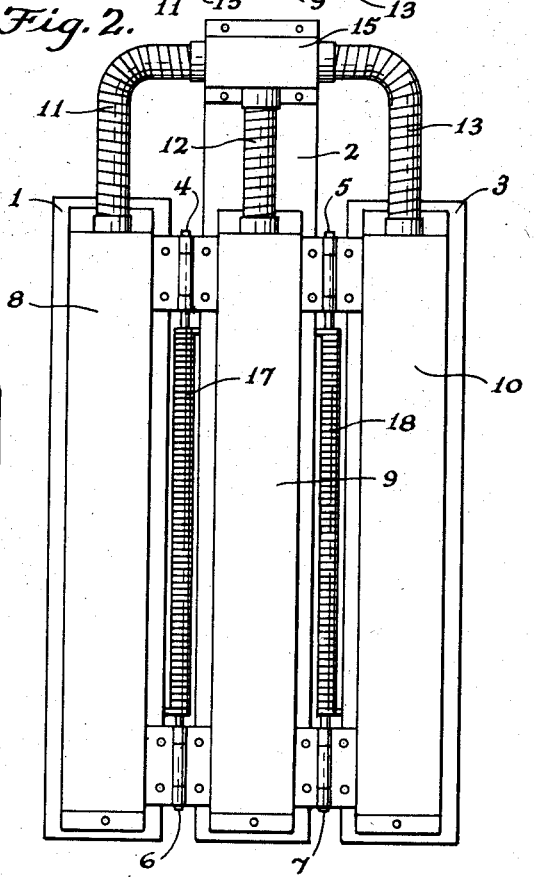
INVENTOR.
JOHAN ALARIK NORDSTRÖM......Deceased,
KAARLO SAMULI OROLA......Administrator.
BY
ATTORNEY.

Patented Sept. 26, 1950

2,523,876

UNITED STATES PATENT OFFICE 2,523,876

ELECTRIC THAWER FOR PIPES

Johan Alarik Nordström, deceased, late of Helsinki, Finland, by Kaarlo Samuli Orola, administrator, Helsinki, Finland, assignor to Oy. Ardo Ab., Helsinki, Finland, a company of Finland Application February 27, 1948, Serial No. 11,515
In Finland January 28, 1941

2 Claims. (Cl. 219—19)

This invention relates to an apparatus of the kind used for thawing frozen water pipes and the like. Such an apparatus is of great significance in thawing quickly and without fire danger the water frozen in and thus plugging pipes. Heretofore many very primitive and even very dangerous methods have been used for this purpose. So e. g. rags have been wound around the pipes over which hot water was subsequently poured or then the pipes were fired directly with an open flame, e. g. a blow-lamp.

This invention obviates the abovementioned defects and provides means for thawing frozen pipes quickly, safely and neatly.

The apparatus consists of at least three longitudinal adjoining thermoelectric elements flexibly linked to each other and adjustable with respect to each other into an angular position in such a manner that said elements can be arranged around pipes with varying diameters.

Some embodiments of the invention are illustrated in the accompanying drawing.

Figure 1 is an end view of the apparatus.

Figure 2 illustrates the side of the apparatus facing the pipe.

Figure 3 is a side view of the device.

Figure 4 is a detail of a modification.

As evident from the drawing the apparatus consists of three metal base plates 1, 2 and 3 linked together with hinges 4, 5, 6 and 7. Casings 8, 9 and 10 accommodate thermo-electric elements and are fastened to the one side of each base plate 1, 2, 3. These elements are coupled to each other with lines 11, 12 and 13 arranged to be enclosed in heat-proof insulation, e. g. porcelain beads covered with tubular plating whereby the desired flexibility for moving said base plates is secured. Electric current from an appropriate source is conducted by means of a line connector coupled by means of a connecting plug to the contacting member 14 of the apparatus. The distributing box of the apparatus is also enclosed in a casing 15. In view of safety regulations the apparatus can be grounded by means of a line coupled to the ground contact 16.

Since the central part of the surface between the edges of plate casing 8, 9, 10 is generally hotter than the edge parts thereof the surface facing the pipe is appropriately made straight and even as shown in Figure 1.

Should the apparatus be intended for pipes of uniform size or such with diameters deviating very little from each other, the said surface of the plate casing can be made concave in a manner corresponding to or almost corresponding to the curvature of the pipe as shown in Figure 4. Thus a close contact between plate casing and pipe is achieved wherefore transference of heat is good.

As illustrated best in Figure 2, the apparatus is provided with e. g. spiral springs 17 and 18, which have the purpose of turning the plates 1 and 3 towards each other and towards plate 2 wherefore said plates "adhere" to the pipe. In Figure 1 the acting direction of the spiral springs is indicated with arrows. In this case the apparatus may be fitted around upright pipes or fixed e. g. from below to a pipe located near the ceiling. Then it is advantageous to provide the apparatus with handle bars e. g. shaped as two bows 19, 20 fastened to both of the base-plates 1 and 3 in such a manner that when holding on to handles 21 and 22 and pressing said bows together the apparatus is made to spread and thus accommodate the pipe. Figures 1, 2 and 3 of the drawing illustrate the apparatus in fully opened position, i. e. all of the base-plates 1, 2 and 3 lie in the same plane, as best shown in Figure 1. Instead of two handle bars naturally only one may be used.

What is claimed is:

1. A device for thawing frozen water pipes or the like which comprises three elongated heating members, each of said members including an electric heating element and a covering housing therefor, each of said housings formed with a work engaging face, pairs of hinges secured to said members for mounting the same in swingable relation with respect to each other, said hinges being mounted with their pintles lying between the front and back borders of said members, each of said pairs of hinges being secured to said members adjacent the remote ends thereof, coiled springs received between and engaged with said members, said coiled springs having their axes in alignment with said hinge pintles, and a pair of handles, one handle of said pair being secured to each of the outside of said three members, said springs serving to swing said outside members inwardly towards each other in the direction of said flat work engaging faces, and said handles, when said heating members are aligned with their work engaging faces in substantially a single plane, extending inwardly and towards each other to terminate closely adjacent each other whereby said device may be readily applied to a pipe to be thawed by a simple one hand operation.

2. A device for thawing frozen water pipes or the like which comprises, a three element heating device constructed for gripping engagement with a pipe, said device including three elongated heating members, said members being aligned in side by side relation and each of said members including a base plate, a covering housing secured on the inner face of said base plate and extending through substantially the entire length thereof, and an electric heating element within said covering housing, said covering housing on the face opposite said base plate being formed with a work engaging surface, and means for swingably mounting the outer pair of said elongated members on the center of said three members about axes lying substantially between the inner edges of said outer members and the edges of said center member, said swingably mounting means including pairs of hinges secured to the base plates of the opposed pairs of members and including spring elements substantially surrounding said axes for urging the outer members inward about said axes, handle members secured to the back of the base plates of the outer of said elongated members, said handle members, when said elongated members are aligned with their base plates in substantially a single plane, terminating closely adjacent each other whereby when said heating members are in operable position on a pipe said handle members can be grasped for operation by the normal hand of a user.

KAARLO SAMULI OROLA.
*Administrator of Estate of Johan Alarik Nordström, now Deceased.*

REFERENCES CITED

The following references are of record in the file of this patent:

UNITED STATES PATENTS

| Number | Name | Date |
| --- | --- | --- |
| 1,316,190 | Sackerman | Sept. 16, 1919 |
| 1,492,821 | Weinbach | May 6, 1924 |
| 1,663,255 | Hynes | Mar. 20, 1928 |
| 1,704,413 | Wait | Mar. 5, 1929 |
| 1,959,594 | Matassa | May 22, 1934 |
| 1,972,621 | Decker | Sept. 4, 1934 |
| 1,998,229 | Frederics | Apr. 16, 1935 |
| 2,426,976 | Taulman | Sept. 2, 1947 |